(12) United States Patent
Syron et al.

(10) Patent No.: US 10,273,174 B2
(45) Date of Patent: Apr. 30, 2019

(54) MEMBRANE AERATED BIOFILM REACTOR (MABR)

(71) Applicant: Oxymem Limited, Athlone (IE)

(72) Inventors: Eoin Syron, Ballina (IE); Wayne Byrne, Rathcoffey (IE)

(73) Assignee: Oxymem Limited, Co Westmeath (IE)

( * ) Notice: Subject to any disclaimer, the term of this patent is extended or adjusted under 35 U.S.C. 154(b) by 207 days.

(21) Appl. No.: 15/122,866

(22) PCT Filed: Mar. 4, 2015

(86) PCT No.: PCT/EP2015/054480
§ 371 (c)(1),
(2) Date: Aug. 31, 2016

(87) PCT Pub. No.: WO2015/132291
PCT Pub. Date: Sep. 11, 2015

(65) Prior Publication Data
US 2017/0088450 A1 Mar. 30, 2017

(30) Foreign Application Priority Data
Mar. 4, 2014 (EP) .................................... 14157725

(51) Int. Cl.
*C02F 3/20* (2006.01)
*B01F 5/10* (2006.01)
(Continued)

(52) U.S. Cl.
CPC .............. *C02F 3/208* (2013.01); *B01D 63/02* (2013.01); *B01D 63/06* (2013.01); *B01F 5/108* (2013.01);
(Continued)

(58) Field of Classification Search
None
See application file for complete search history.

(56) References Cited

U.S. PATENT DOCUMENTS

| 5,846,816 A * | 12/1998 | Forth | C12M 21/02 |
|---|---|---|---|
| | | | 435/292.1 |
| 8,741,101 B2 * | 6/2014 | Duesel, Jr. | B01D 1/18 |
| | | | 159/4.01 |
| 2011/0042308 A1 * | 2/2011 | Krause | B01D 65/02 |
| | | | 210/615 |

FOREIGN PATENT DOCUMENTS

| CN | 102531153 | 7/2012 |
| JP | 2006-101805 | 4/2006 |
| WO | WO 2008/024445 | 2/2008 |

OTHER PUBLICATIONS

Casey, et al., "Review of membrane aerated biofilm reactors", Resources Conservation and Recycling, vol. 27, No. 1-2, Jul. 1, 2009, pp. 203-215.
(Continued)

*Primary Examiner* — Chester T Barry
(74) *Attorney, Agent, or Firm* — Cesari & McKenna, LLP

(57) ABSTRACT

A device for treating wastewater liquids, the device comprising a housing (4) incorporating a membrane supported biofilm reactor (MSBR) (2) of the type comprising a lumen containing a gas phase, a liquid phase, and a gas permeable membrane (20) providing an interface between the gas and liquid phases; and a means (6) for mixing the wastewater liquids in the device, wherein the means (6) for mixing the wastewater liquids is configured to create a mixing intensity sufficient to ensure that there is contact between the membrane (20) and the wastewater liquid to be treated.

20 Claims, 3 Drawing Sheets

(51) Int. Cl.
*B01D 63/02* (2006.01)
*C02F 3/10* (2006.01)
*C02F 3/22* (2006.01)
*B01D 63/06* (2006.01)
*B01F 7/22* (2006.01)
*B01F 7/16* (2006.01)

(52) U.S. Cl.
CPC ............... *B01F 7/22* (2013.01); *C02F 3/102* (2013.01); *C02F 3/22* (2013.01); *B01D 2315/06* (2013.01); *B01F 7/168* (2013.01); *B01F 2215/0052* (2013.01); *C02F 3/201* (2013.01); *Y02W 10/15* (2015.05)

(56) References Cited

OTHER PUBLICATIONS

You, et al., "Ammonia oxidizing bacteria in a nitrite-accumulating membrane bioreactor", International Biodeterioration and Biodegradation, vol. 62, No. 3, Oct. 1, 2008.

* cited by examiner

MEMBRANE AERATED BIOFILM REACTOR (MABR)

CROSS REFERENCE TO RELATED APPLICATIONS

This application is the National Stage of International Application No. PCT/EP2015/054480, filed on Mar. 4, 2015, which claims the benefit of European Patent Application No. 14157725.4, filed on Mar. 4, 2014. The contents of both applications are hereby incorporated by reference in their entirety.

FIELD OF THE INVENTION

The invention relates to membrane aerated biofilm reactors (MABRs). In particular, the invention relates to a method of mixing a membrane aerated biofilm reactor.

BACKGROUND TO THE INVENTION

Innovation in wastewater treatment technology is driven largely by the need to meet increasingly stringent regulatory standards and by the desire to reduce the capital and operating costs of treatment processes. In recent years, these drivers have prompted the emergence of improved biofilm processes such as the Biological Aerated Filter (BAF) and the Moving Bed Biofilm Reactor (MBBR). One of the key advantages of biofilm-based processes is the potentially high volumetric reaction rate that can be attained due to the high specific biomass concentration. Unfortunately, this advantage is rarely exploited in full-scale processes as a result of oxygen transfer limitations into thick biofilms. Biofilms in wastewater treatment systems are frequently thicker than the penetration depth of oxygen, typically 50 μm to 150 μm and, under high carbon-loading rates, the process becomes oxygen transfer rate limited. This problem, combined with the difficulty in controlling biofilm thickness has resulted in the application of biofilm technology predominantly for low-rate processes.

Innovative technologies to overcome this problem are mainly based on methods that increase the specific surface area (particle based biofilm technologies), or on methods for increasing the oxidation capacity and efficiency, such as a Membrane-Aerated Biofilm Reactor (MABR). MABR have long been exploited as an innovative wastewater treatment reactor biofilm, comprising a community of microorganisms attached to a surface. Natural immobilization of the microbial community on inert supports allows excellent biomass retention and accumulation without the need for solid-separation devices. In the context of wastewater treatment, the ability of biofilm based processes to completely uncouple solids retention time (SRT) from hydraulic retention time (HRT) is especially useful for slow-growing organisms which would otherwise be washed out of the system, nitrifying biofilms being a case in point. The MABR has several advantages over conventional biofilm technologies;

(1). Comparatively high volumetric carbon oxygen demand (COD) removal rates are achievable if pure oxygen is fully exploited and if biofilm thickness-control measures are in place.

(2). Bubbleless aeration offers the potential for significantly higher oxygen utilization efficiencies with consequent energy savings. In addition, reduced air stripping during the biotreatment of volatile organic compounds is possible.

(3). Simultaneous nitrification, denitrification and COD removal can be achieved at comparatively higher rates due to the unique microbial population stratification.

(4). Specialist degrading microorganisms, such as ammonia oxidizing bacteria, tend to be preferentially located adjacent to the biofilm-membrane interface thereby enhancing their retention by protection from biofilm erosion.

However, commercial exploitation of the technology has not yet emerged due to the disadvantages as discussed above, and until the present time, there have been very limited trials of the technology beyond laboratory scale. Additional mixing in an aerobic wastewater treatment reactor is generally not required as the bubble aerators or the surface aerators have associated mixing. In anoxic or anaerobic reactors external mixing is required. This is generally carried out by large submerged mixers or jet mixers where the aim is to keep suspended biomass or suspended biomass carriers in suspension and moving throughout the housing. The disadvantage of using bubble or surface aerators and submerged or jet mixers is that they provide effective mixing only in tanks without any restrictions to fluid flow and they have a relatively large energy demand.

Chinese Patent Document CN102531153A describes a MABR having an external conduit for conveying the waste liquid from an upper headspace to a lower headspace. However, the MABR uses a pump situated at the bottom of the housing, which prevents biomass from settling and keeps biomass suspended and moving throughout the housing. S. J You and W. Y. Chen (International Biodeterioration & Biodegradation, vol. 62. pp. 2-249 (2008)) describe a sequencing batch membrane bioreactor using an impellor to mix and maintain the biomass from the liquid waste in suspension, thus making it difficult to remove.

It is an object of the present invention to overcome at least one of the above-referenced problems.

SUMMARY OF THE INVENTION

The object of the present application is to reduce the energy requirement for mixing in a membrane-aerated biofilm reactor (MABR), while at the same time maintaining the effective contact between the pollutant-degrading biofilm and the wastewater to be treated, and thus improve the performance of the biological wastewater treatment system. In the MABR, the biofilm is naturally immobilized on an oxygen permeable membrane. Oxygen diffuses through the membrane into the biofilm where oxidation of pollutants, supplied at the biofilm-liquid interface, takes place. The oxygen supply rate is controlled by the intra-membrane oxygen partial pressure (a process parameter) and membrane surface area (a design parameter). However, in conventional wastewater treatment processes, oxygen is provided by pumping air to the bottom of a wastewater treatment tank. The air then enters the liquid via diffusers forming bubbles which rise up through the wastewater, transferring oxygen to the wastewater and also providing mixing in the treatment tank. As the MABR has no air being pumped to create bubbles, maintaining high performance rates over long-term trials has proven to be very difficult.

To ensure the MABR can become an effective technology for wastewater treatment, there is a critical need to ensure that the reactor is well mixed and that there is effective contact between as much of the membrane-attached pollutant-degrading biofilm and the pollutant-rich wastewater to be treated. The Applicants have provided a solution for sufficiently mixing the wastewater fluid in a MABR treatment housing or tank while maintaining low energy requirements to mix the liquid in the MABR treatment housing. This mixing will keep the liquid in the MABR treatment housing adequately mixed but allow for the settling of detached biofilm particles and other suspended solids which are greater in size than (0.5 mm).

According to the present invention there is provided, as set out in the appended claims, a membrane-aerated biofilm reactor (MABR) of the type comprising: a housing having an upper and lower headspace; an array of membranes disposed within the housing and extending from the upper headspace to the lower headspace, each membrane defining a lumen configured to contain a gas phase; means for conveying liquid waste to the array of membranes, in which the means for conveying liquid waste comprises a draft tube disposed within housing adapted to provide fluid communication between the lower headspace and the upper headspace, and a liquid conveying means disposed within the draft tube in which liquid is conveyed from the lower headspace to the upper headspace, wherein the conveying means creates a flow of liquid waste with a force that allows for settling of biomass and other solid particles that have a detached from the array of membranes while the liquid continues to be conveyed between the lower headspace and upper headspace.

Ideally, the draft tube comprises a liquid waste inlet port that spaced from the bottom of the housing. This prevents the inlet port from being clogged or blocked by particulate material that may be falling down off the membranes through the waste liquid.

In one embodiment, the draft tube comprises an upwardly extending portion having a liquid waste outlet in fluid communication with a generally transverse portion comprising at least one liquid waste inlet. Preferably, the draft tube is substantially L-shaped. Suitably, the at least one liquid waste inlet is disposed on an underside of the generally transverse portion. Preferably, the generally transverse portion comprises a plurality of liquid waste inlets, ideally disposed on an underside of the generally transverse portion (for example facing a base of the housing). Suitably, the draft tube is disposed within the housing such that the generally transverse portion is disposed in the lower headspace.

In one embodiment, the least one inlet port is disposed on an underside of the generally transverse portion facing the lower headspace and away from the upper headspace.

Preferably, the liquid conveying means disposed within the draft tube is selected from a means for introducing gas into the draft tube, a propeller pump or an impeller disposed therein to provide a means for conveying liquid waste from the lower headspace to the upper headspace.

When using a mechanical device (e.g. a propeller pump) or a means for introducing a gas into the draft tube, the flow of liquid waste is generated by the creation of a pressure differential between the liquid waste inside the draft tube and the liquid waste outside the draft tube. This pressure differential causes the liquid waste to enter the bottom of the draft tube from the lower headspace and travels upwards through the draft tube to the upper headspace.

Ideally, the liquid conveying means disposed within the draft tube is a means for introducing gas into the draft tube or a propeller pump disposed within the draft tube, whereby the liquid waste is conveyed from the lower headspace to the upper headspace by means of a pressure differential between the waste liquid within the draft tube and the waste liquid outside the draft tube.

Preferably, the means for introducing gas into the draft tube or the propeller pump is positioned at any point along the upwardly extending portion of the draft tube. When the propeller pump is used, the liquid waste is pumped in the upward direction toward the upper headspace along the upwardly extending portion of the draft tube. When the means for introducing gas into the draft tube is used, the gas is delivered via a gas supply tube (pipe) attached to the side of the upwardly extending portion of the draft tube with the gas rising upward in the draft tube towards the upper headspace. Generally, the propeller pump is mechanically coupled to the draft tube by any suitable means known to the skilled person.

In one embodiment, whereby when the liquid conveying means disposed within the draft tube is the means for introducing a gas into the draft tube, the liquid is conveyed from the lower headspace to the upper headspace by means of a pressure differential between the waste liquid within the draft tube and the waste liquid outside the draft tube created by the introduction of gas into the draft tube.

In one embodiment, the draft tube may be positioned centrally in the housing and the array of membranes are arranged around the draft tube.

In one embodiment, the draft tube may be positioned at a side of the housing.

In one embodiment, the draft tube may be positioned at a corner of the housing.

In one embodiment the draft tube may be positioned in the housing in at least two of a central position, a side position or a corner position.

In one embodiment, the conveying means produces a flow rate that results in complete liquid waste turnover of the housing volume is between 1-60 minutes. Preferably, complete liquid waste turnover of the housing volume is between 1-45 minutes, 1-30 minutes or 1-15 minutes.

Preferably, the conveying means is configured to generate a flow rate in the incoming liquid waste such that the hydraulic residence time of the liquid in the housing is between 0.5 hours or 1 hour or 1.5 hours or 2 hours and 15 days.

According to the present invention, there is provided, as set out in the appended claims, a method of operation of a membrane-aerated biofilm reactor (MABR) as described above, the method comprising the step of actuating the liquid conveying means to force liquid waste from the lower headspace through the draft tube to the upper headspace, wherein the conveying means creates a flow of liquid waste with a force that allows for settling of biomass and other solid particles that have a detached from the array of membranes while maintaining the fluid communication between the lower headspace and upper headspace.

Preferably, whereby when the liquid conveying means disposed within the draft tube is a means for introducing a gas into the draft tube, the liquid is conveyed by means of a pressure differential between the waste liquid within the draft tube and the waste liquid outside the draft tube within the housing. This permits biomass and other solid particles that have a detached from the array of membranes settle in the housing for removal while maintaining the fluid communication between the lower headspace and upper headspace.

In one embodiment, the liquid waste is conveyed at a flow rate that results in complete waste liquid turnover of the housing volume in between 1-60 minutes. Preferably, complete liquid waste turnover of the housing volume is between 1-45 minutes, 1-30 minutes or 1-15 minutes.

Preferably, the conveying means is configured to generate a flow rate in the incoming liquid waste such that the hydraulic residence time of the liquid in the housing is between 0.5 hours or 1 hour or 1.5 hours or 2 hours and 15 days.

In one embodiment of the invention, there is provided a membrane-aerated biofilm reactor (MABR) of the type comprising: a housing having an upper and lower headspace; an array of membranes disposed within the housing and extending from the upper headspace to the lower headspace, each membrane defining a lumen configured to contain a gas phase; a draft tube disposed within the housing, wherein the draft tube is adapted to provide fluid communication between the lower headspace and the upper headspace and for conveying liquid waste to the array of membranes; and a liquid conveying means disposed within the draft tube in which liquid is conveyed from the lower headspace to the upper headspace by means of a pressure differential between the waste liquid within the draft tube and the waste liquid outside the draft tube within the housing, in which biomass and other solid particles that have detached from the array of membranes settle in the housing for removal while liquid continues to be conveyed between the lower headspace and upper headspace.

Preferably, the liquid conveying means disposed within the draft tube is a means for introducing gas into the draft tube or a propeller pump disposed within the draft tube, whereby the liquid waste is conveyed from the lower headspace to the upper headspace by means of a pressure differential between the waste liquid within the draft tube and the waste liquid outside the draft tube.

There is also provided a method of operation of a membrane-aerated biofilm reactor (MABR) according to the above-described MABR device, the method comprising the step of actuating the liquid conveying means to force liquid waste from the lower headspace through the draft tube to the upper headspace by means of a pressure differential between the waste liquid within the draft tube and the waste liquid outside the draft tube within the housing, in which biomass and other solid particles that have a detached from the array of membranes settle in the housing for removal while maintaining the fluid communication between the lower headspace and upper headspace.

In the specification, the term "Membrane Aerated Biofilm Reactor (MABR)" should be understood to mean a membrane supported biofilm reactor (MSBR) for treating wastewater liquids to remove carbonaceous pollutant removal, nitrify/denitrify the pollutants, and/or perform xenobiotic biotreatment of the wastewater constituents, and they generally employ an air/oxygen/hydrogen/methane (gas) permeable membrane (often a hollow fibre membrane) that provides an interface between the fluid to be treated (fluid phase) and an air/oxygen/hydrogen supply (gas phase). Soluble organic compounds in the liquid are supplied to the biofilm from the biofilm-liquid interface, whereas air/oxygen/hydrogen supply to the biofilm is from the biofilm-membrane interface (by diffusing through the membrane). Typically, a biofilm consisting of a heterogeneous population of bacteria (generally including nitrifying, denitrifying, and heterotrophic, bacteria) grows on the fluid phase side of the membrane. MABRs can achieve bubble-less aeration and high oxygen utilization efficiency (up to 100%) and the biofilm can be separated into aerobic/anoxic/anaerobic zones to simultaneously achieve removal of carbonaceous organic pollutants, as well as nitrification and denitrification in a single biofilm. An example of MABRs of the type comprising a lumen containing a gas phase, a liquid phase, and a gas permeable membrane providing an interface between the gas and liquid phases are described by European Patent No. 2 361 367 (University College Dublin).

In the specification, the term "draft tube" should be understood to mean a draft tube typically known to those skilled in the art, such as that which has been used for mixing in crystallisation reactors, as described in WO 2013177402 A1 (Veolia Water Solutions & Technologies Support). Draft tubes provide a conduit through which the wastewater liquid can flow within the MABR tank. The draft tube may comprise an upwardly extending portion having a liquid waste outlet in fluid communication with a generally transverse portion comprising at least one liquid waste inlet. The generally transverse portion of the draft tube is usually perpendicular to the array of membranes while the upwardly extending portion is generally parallel to the array of membranes.

In the specification, the term "housing" should be understood to mean a holding vessel, such as a tank, within which is placed the MABR. The term "housing" and "tank" may be used interchangeably.

A type of mixer exists called a vertical propeller pump. This type of pump is used to pump large volumes at low discharge pressures. However, the flow-rate achieved by these pumps would be too great and would maintain too many of the solids in the device of the invention in suspension, thereby not allowing for settling of the associated detached biomass and influent solids.

From a biocatalytic point of view, the more membranes and biofilm in a wastewater treatment housing the better. However, above a certain limit the accumulation of biofilm can cause severe problems with liquid flow distribution. Therefore, an effective flow distribution must be maintained. The ideal MABR will operate in a cyclical manner with biofilm accumulation, partial removal and re-growth. The biofilm removal events can be carried by short intense bursts of air scour, which would detach large amounts of biomass. Commercially the membrane packing density must be increased to provide the most gas transferring membranes per unit of reactor volume. Many of the laboratory scale studies reported to-date in the literature were operated with low membrane packing densities. This current invention describes a device to allow for low energy mixing, which creates a movement of the liquid waste so as to provide biofilm accumulation, partial removal and re-growth; and allows settling of the detached biomass and other solid particles greater than (0.5 mm) in size at the bottom of the device. The current invention also results in effective contact of the liquid waste with all of the membranes in the reactor. The insertion of a conveying means (for example, a draft tube or a draft tube-like configuration, or an upward mixing flow channel) also allows for more control over the flow regime in the device. It allows for the conveying means to be located in either one or a combination of the centre of the housing, at the sides of the housing, or at the corners of the housing, closely surrounded by the downward flow over the membrane surface.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The present invention relates to a device and a method for treating liquid waste by using low energy mixing, which creates movement of the liquid waste only and allows settling of detached biomass and other solid particles greater than (0.5 mm) in size. The current invention also results in effective contact of the wastewater with a densely packed array of biofilm membranes. The insertion of a conveying means (a draft tube or a draft tube-like configuration or an upward mixing flow channel) also allows for more control over the flow regime in the device. It allows for the conveying means to be located either in the centre of the array of membranes, at the sides at the corners, or a combination of two or more of those positions and closely surrounded by the downward flow over the membrane surface (see, for example, FIG. 1 and FIG. 3).

Figure 1:
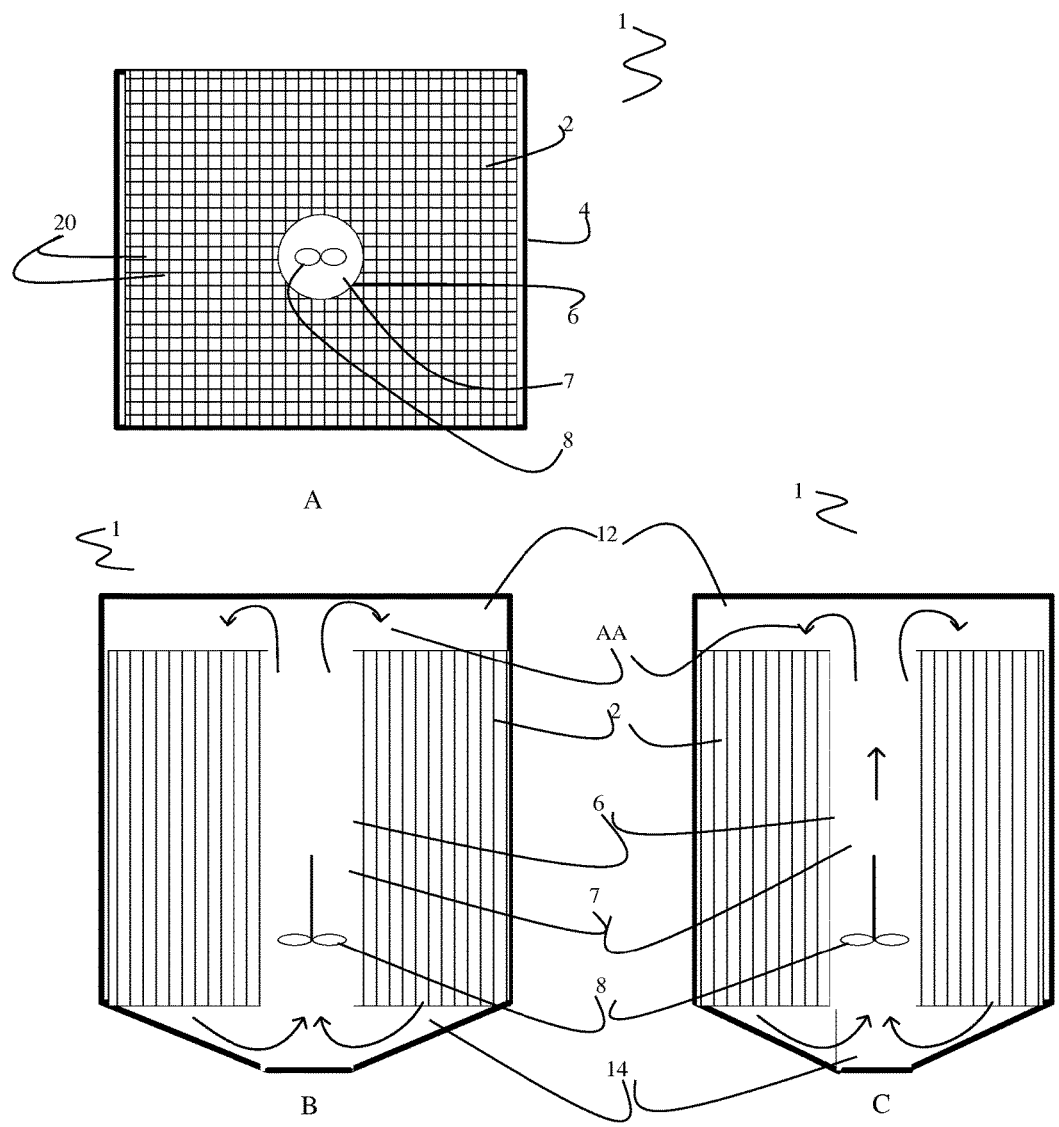
FIG. 1 illustrates (A) a plan view, (B) an elevation view and (C) an end view of one embodiment of a membrane aerated biofilm reactor (MABR) device of the present application.

Referring now to the figures, where FIG. 1 illustrates a general embodiment of a membrane aerated biofilm reactor (MABR) device of the present invention. Specifically, FIG. 1A illustrates a plan view of a typical MABR device of the present invention, and is generally referred to by reference numeral 1. The MABR device 1 comprises a MABR 2 within a housing 4. The MABR 2 comprises a plurality of densely packed array of membranes 20 upon which a biofilm is grown and accumulates. In order to ensure a constant liquid movement of wastewater liquid, a conveying means 6 is nestled substantially centrally within the array of membranes 20 of the MABR 2. The conveying means comprises a hollow conduit 7 and an impeller 8. The conduit 7 in this example is a draft tube 7. The impeller 8 is driven by a small motor (not shown) which causes the impeller 8 to turn or rotate. The rotation of the impeller 8 causes the flow of the liquid waste to move from a lower headspace 14 of the tank 4 in a direction along arrow AA to an upper headspace 12 of the tank 4. This upward flow of the liquid waste through the draft tube 7, causing a downward flow of the liquid waste in the tank 4 from headspace 12 to headspace 14, results in said liquid being in constant dynamic contact with the membranes 20.

Figure 2:
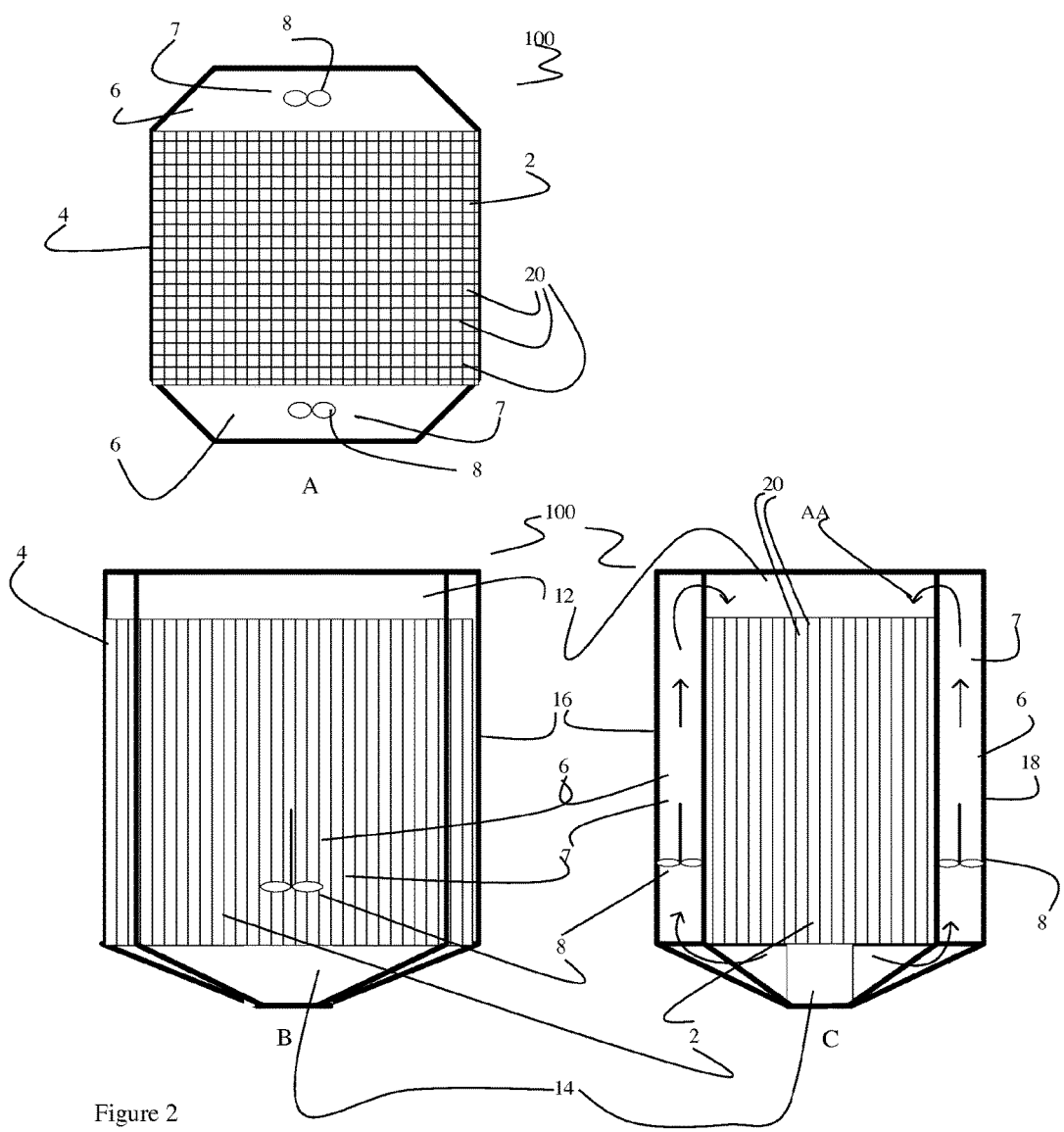
FIG. 2 illustrates (A) a plan view, (B) an elevation view and (C) an end view of a further embodiment of a membrane aerated biofilm reactor (MABR) device of the present application.

Referring to FIG. 2, there is illustrated an embodiment of the device in which parts or steps described with reference to the previous embodiment are assigned the same numerals. In the embodiment, the MABR device 100 comprises a membrane aerated biofilm reactor (MABR) 2 within a housing 4. The MABR 2 comprises an array of densely packed membranes 20 upon which a biofilm is grown and accumulates. In order to ensure a constant liquid movement of liquid waste within the device 100, a conveying means 6 is positioned within the housing 4 and generally juxtaposed the MABR 2. The conveying means 6 comprises a hollow draft tube 7 (as per FIG. 1) and an impeller 8. The impeller 8 is driven by a small motor (not shown) which causes the impeller 8 to turn or rotate. The rotation of the impeller 8 causes the flow of the liquid waste to move from a lower headspace 14 of the tank 4 in a direction along arrow AA to an upper headspace 12 of the tank 4. This flow AA of the liquid waste in the tank 4 from headspace 14 to headspace 12, results in said liquid being in constant dynamic contact with the array of membranes 20. The positioning of the conveying means 6 in this here described embodiment can be, for example, at a side 16 of the housing 4 (as per FIG. 2B) or positioned on either side of the MABR 2 on sides 16 and 18 of the housing 4 (as per FIGS. 2A and 2C). In a further embodiment, the conveying means 6 can be positioned on all sides and in all corners of the MABR device 1,100.

The conveying means 6 described for FIGS. 1 and 2 is known as a draft tube in the art. The hollow draft tube 7 surrounding the impeller 8 is a flared construction allowing for the distribution of flow from the impeller 8. Because of the depth of the draft tube 7 in the device 1, it allows for the inlet flow to the draft tube 7 to be drawn from deep in the device 1, despite using a low energy mixer. The low pressure created underneath the mixing impeller 8 causes liquid to rush up the draft tube 7 from its base thereby pulling liquid waste from the bottom of the tank.

Figure 3:
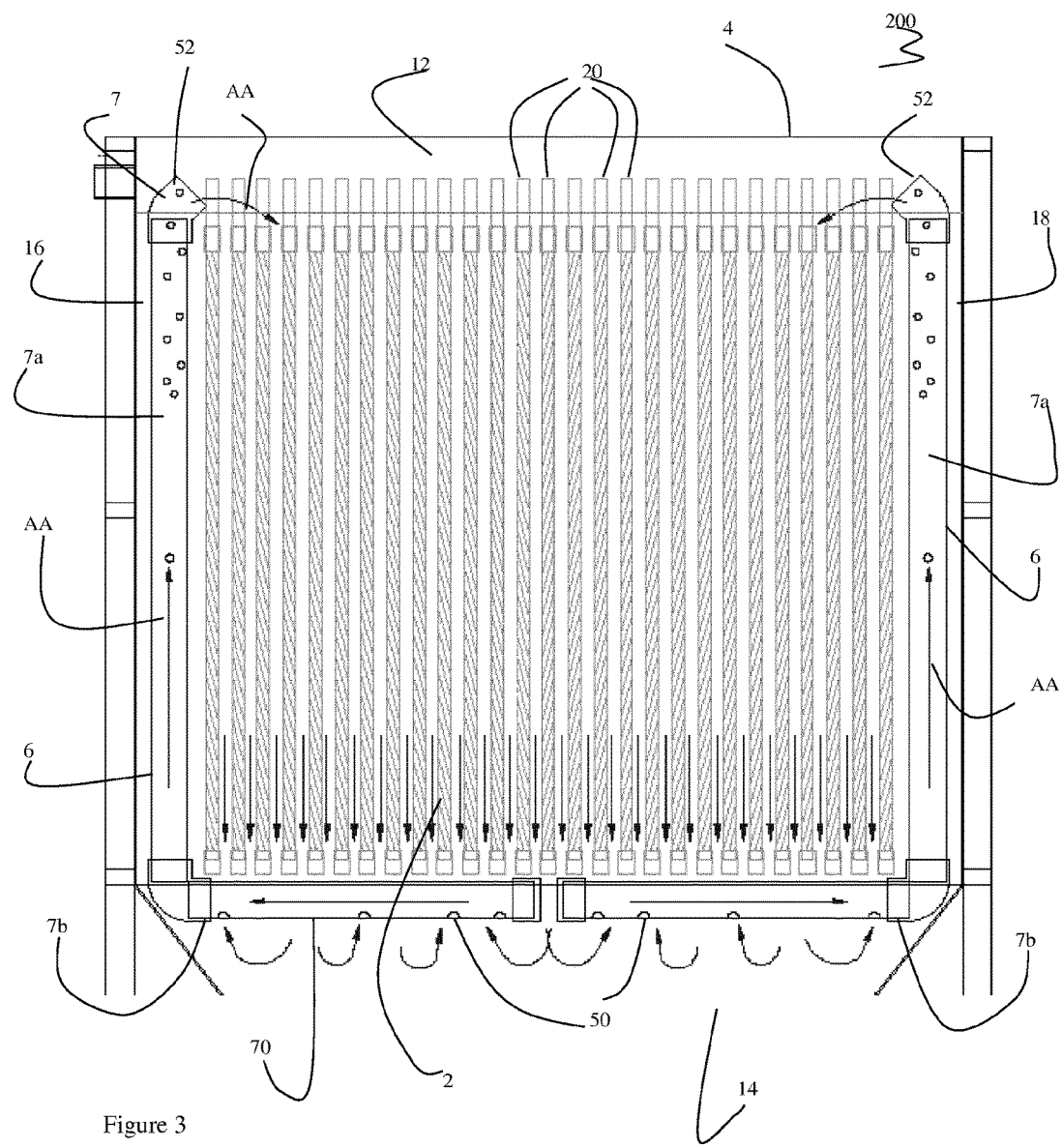
FIG. 3 illustrates a side view of a further embodiment of a membrane aerated biofilm reactor (MABR) device of the present application.

Referring to FIG. 3, there is illustrated an embodiment of the device in which parts or steps described with reference to the previous embodiments are assigned the same numerals. In the embodiment, the MABR device 200 comprises a membrane aerated biofilm reactor (MABR) 2 within a housing 4. The MABR 2 comprises an array of densely packed membranes 20 upon which a biofilm is grown and accumulated. In order to ensure a constant fluid movement of liquid waste within the device 200, a conveying means 6 is positioned within the housing 4 and generally juxtaposed the MABR 2. The conveying means 6 comprises a hollow conduit or draft tube 7a,7b. The draft tube 7a,7b, having a generally upwardly extending portion (axis) 7a having a liquid waste outlet 52. The upwardly extending portion 7a is in fluid communication with a generally transverse portion (axis) 7b comprising at least one liquid waste inlet 50. As illustrated in FIG. 3, the generally upwardly extending portion (axis) 7a is essentially parallel to the array of membranes, while the generally transverse portion (axis) 7b is perpendicular to the array of membranes 20.

As illustrated in FIG. 3, flow in the draft tube 7a,7b is induced in the direction AA by the creation of a pressure difference between the liquid inside the draft tube 7a,7b and the liquid outside the draft tube 7a,7b in the housing 4. This pressure difference can be created by insertion of air or gas (via air injection through a pipe, or via an air blower (pump), coupled to the generally upwardly extending portion of the draft tube 7a) into the generally upwardly extending portion of the draft tube 7a or by placing a propeller pump inside the generally upwardly extending portion of the draft tube 7a to create a pressure differential. The location where air or gas is injected, or where the propeller pump is positioned, can be anywhere along the generally upwardly extending portion of the draft tube 7a. The generally transverse portion of the draft tube 7b extends perpendicular to and is spaced below the array of densely packed membranes 20. The generally transverse portion of the conduit 7b contains at least one liquid waste inlet 50 through which the waste liquid from the lower headspace 14 enters the draft tube 7a,7b to be conveyed into the upper headspace 12, and over the array of membranes 20. This creates a downward flow (opposite in direction to the flow AA in the conduit 7a) through the array of membranes 20, bringing detached biomass to the bottom of the housing (tank) 4 where the biomass can settle and be removed. This flow AA of the liquid waste in the tank 4 from headspace 14 to headspace 12 and back down to the headspace 14, results in said liquid being in constant dynamic contact with the array of membranes 20.

Ideally, the liquid waste inlet 50 (or a plurality thereof) are disposed on an underside 70 of the generally transverse portion 7b, spaced from and facing a base of the housing 4. Generally, the plurality of liquid waste inlets 50 face or are generally open to the lower headspace 14 and away from the upper headspace 12. This prevents the liquid waste inlets 50 from being clogged or blocked by particulate material that may be falling down off the array of membranes 20 through the waste liquid. Being generally spaced from the bottom of the housing 4 also aids in permitting the detached biomass to settle at the bottom of the housing 4 for removal. The positioning of the conveying means 6 in this here described embodiment is generally at a side 16, 18 of the housing 4 (as per FIG. 3). In a further embodiment, the conveying means 6 can be positioned on all sides and in all corners of the MABR device 1,100,200.

The present invention overcomes at least one of the problems associated with previous uses of densely packed biofilm supported membrane reactor in water treatment facilities, by maintaining a liquid motion across a densely packed membrane surface. This ensures that the entire liquid volume of the housing 4 is utilised and that all the biofilm coated membranes 20 in the housing 4 are in contact with the mixed liquid. The direction of flow is also important. The MABR device 1,100,200 ensures that the flow is downward over the vertical membranes 20. The biofilm growing in a downward flow is then more easily scoured from the surface of the membranes 20 when a (air) bubble scour is required for biofilm thickness control. A change in the direction of shear force is a more effective method of biofilm removal than an increase in shear force.

Another advantage of the subject invention is that the device 1,100,200 can operate continuously for prolonged periods with minimal operator intervention at sustained high reaction rates. Further advantages include reducing the mixing energy requirements; provide effective liquid mixing even with large quantities of membranes are present, which restrict fluid flow; and provide liquid mixing while at the same time allowing the settling and removal of suspended solids.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A membrane-aerated biofilm reactor (MABR) of the type comprising: a housing having an upper and lower headspace; an array of membranes disposed within the housing and extending from the upper headspace to the lower headspace, each membrane defining a lumen configured to contain a gas phase; a means for conveying liquid waste to the array of membranes, in which the means for conveying liquid waste comprises a draft tube disposed within the housing adapted to provide fluid communication between the lower headspace and the upper headspace; and a liquid conveying means disposed within the draft tube in which liquid is conveyed from the lower headspace to the upper headspace, wherein the liquid conveying means creates a flow of liquid waste with a force that allows for settling of biomass and other solid particles that have detached from the array of membranes while the liquid continues to be conveyed between the lower headspace and upper headspace.

2. A MABR according to claim 1, wherein the draft tube comprises an upwardly extending portion having a liquid waste outlet in fluid communication with a generally transverse portion comprising at least one liquid waste inlet.

3. A MABR according to claim 1, wherein the at least one liquid waste inlet is spaced from the bottom of the housing.

4. A MABR according to claim 1, wherein the least one inlet port is disposed on an underside of the generally transverse portion facing the lower headspace and away from the upper headspace.

5. A MABR according to claim 1, wherein the liquid conveying means disposed within the draft tube is selected from a means for introducing gas into the draft tube, a propeller pump or an impeller.

6. A MABR according to claim 1, wherein the liquid conveying means disposed within the draft tube is selected from a means for introducing gas into the draft tube, a propeller pump or an impeller and wherein the means for introducing gas into the draft tube or the propeller pump is positioned along an upwardly extending portion of the draft tube.

7. A MABR according to claim 1, wherein the liquid conveying means disposed within the draft tube is selected from a means for introducing gas into the draft tube, a propeller pump or an impeller and wherein the means for introducing gas into the draft tube or the propeller pump is positioned along an upwardly extending portion of the draft tube, and whereby when the liquid conveying means disposed within the draft tube is the means for introducing a gas into the draft tube, the liquid is conveyed from the lower headspace to the upper headspace by means of a pressure differential between the waste liquid within the draft tube and the waste liquid outside the draft tube created by the introduction of gas into the draft tube.

8. A MABR according to claim 1, wherein the draft tube is positioned centrally in the housing and the array of membranes is arranged around the draft tube.

9. A MABR according to claim 1, wherein the draft tube is positioned at a side of the housing.

10. A MABR according to claim 1, wherein the draft tube is positioned at a corner of the housing.

11. A MABR according to claim 1, wherein the draft tube is positioned in the housing in at least two of a central position, a side position or a corner position.

12. A MABR according to claim 1, wherein a complete liquid waste turnover of the housing volume is completed between 1 and 60 minutes.

13. A MABR according to claim 1, wherein a hydraulic residence time of the liquid waste in the housing is between 0.5 hours and 15 days.

14. A method of operation of a membrane-aerated biofilm reactor (MABR) according to claim 1, the method comprising the step of actuating the liquid conveying means to force liquid waste from the lower headspace through the draft tube to the upper headspace, wherein the liquid conveying means creates a flow of liquid waste with a force that allows for settling of biomass and other solid particles that have detached from the array of membranes while maintaining the fluid communication between the lower headspace and upper headspace.

15. A method as claimed in claim 14, whereby when the liquid conveying means disposed within the draft tube is a means for introducing a gas into the draft tube, the liquid is conveyed by means of a pressure differential between the waste liquid within the draft tube and the waste liquid outside the draft tube within the housing.

16. A method as claimed in claim 14 in which the complete waste liquid turnover of the housing volume is completed in between 1 and 60 minutes.

17. A MABR according to claim 2, wherein the at least one liquid waste inlet is spaced from the bottom of the housing.

18. A MABR according to claim 2, wherein the least one inlet port is disposed on an underside of the generally transverse portion facing the lower headspace and away from the upper headspace.

19. A MABR according to claim 3, wherein the least one inlet port is disposed on an underside of the generally transverse portion facing the lower headspace and away from the upper headspace.

20. A MABR according to claim 2, wherein the liquid conveying means disposed within the draft tube is selected from a means for introducing gas into the draft tube, a propeller pump or an impeller.

* * * * *